(12) United States Patent
Wilkes

(10) Patent No.: US 10,507,864 B2
(45) Date of Patent: Dec. 17, 2019

(54) GEARBOX ASSEMBLY FOR AN ELECTRIC POWER STEERING ASSEMBLY

(71) Applicant: TRW Limited, Solihull, West Midlands (GB)

(72) Inventor: Mark Anthony Wilkes, Birmingham (GB)

(73) Assignee: TRW Limited, Solihull, West Midlands (GB)

( * ) Notice: Subject to any disclaimer, the term of this patent is extended or adjusted under 35 U.S.C. 154(b) by 0 days.

(21) Appl. No.: 15/568,537

(22) PCT Filed: Apr. 22, 2016

(86) PCT No.: PCT/GB2016/051141
§ 371 (c)(1),
(2) Date: Oct. 23, 2017

(87) PCT Pub. No.: WO2016/170369
PCT Pub. Date: Oct. 27, 2016

(65) Prior Publication Data
US 2018/0154927 A1    Jun. 7, 2018

(30) Foreign Application Priority Data

Apr. 23, 2015 (GB) .................................. 1506952.9
Jul. 6, 2015 (GB) .................................. 1511811.0

(51) Int. Cl.
*B62D 5/04* (2006.01)
*F16H 1/16* (2006.01)

(52) U.S. Cl.
CPC ............. *B62D 5/0409* (2013.01); *B62D 5/04* (2013.01); *F16H 1/16* (2013.01)

(58) Field of Classification Search
CPC ............ B62D 5/0409; B62D 5/04; F16H 1/16
See application file for complete search history.

(56) References Cited

U.S. PATENT DOCUMENTS 9,671,011 B2 * 6/2017 Kimijima .................. F16H 1/16
2009/0294205 A1 * 12/2009 Wilkes ................ B62D 5/0409
180/444

(Continued)

FOREIGN PATENT DOCUMENTS

DE    102007047369 A1    4/2009
DE    202014003775 U1    6/2014

(Continued)

OTHER PUBLICATIONS

Patent Act 1977: Search Report under Section 17(5), Application No. GB1506952.9, dated Sep. 11, 2015.

(Continued)

*Primary Examiner* — Kevin Hurley
*Assistant Examiner* — Marlon A Arce
(74) *Attorney, Agent, or Firm* — MacMillan, Sobanski & Todd, LLC

(57) ABSTRACT

A gearbox assembly for an electric power assisted steering apparatus. The assembly comprises a gearbox housing which houses a worm shaft and a gear wheel, the worm shaft being supported relative to the housing by a main bearing assembly at an end closest to the motor and by a tail bearing assembly, at an end furthest from the motor, comprising an inner race and an outer race separated by bearing elements. The gearbox assembly further comprises a first guiding surface upon which the outer race is supported, the outer race being able to move by rolling along the guiding surface when a radial load is applied to the tail bearing assembly by the worm shaft, and a guide device which contacts both the outer bearing and a second guiding surface, the biasing spring acting upon the tail bearing assembly indirectly by acting upon the guide device which in turn acts upon the bearing assembly. The gear wheel i supported by an output shaft having at least one end that provides a take-off from the (Continued)

gearbox assembly. The tail bearing assembly is free to move relative to the housing through a limited range of motion that enables the worm shaft to move radially away from the axis of the wheel gear. The apparatus further includes a biasing spring that applies a biasing force to the tail bearing assembly that biases the worm shaft into engagement with the wheel gear.

15 Claims, 7 Drawing Sheets

(56) References Cited

U.S. PATENT DOCUMENTS

| | | | | |
|---|---|---|---|---|
| 2010/0140011 A1* | 6/2010 | Wilkes | ......... | B62D 5/0409 180/444 |
| 2013/0126260 A1 | 5/2013 | Kim | | |

FOREIGN PATENT DOCUMENTS

| | | | |
|---|---|---|---|
| EP | 1225116 A2 | | 7/2002 |
| JP | 2013087868 A | | 5/2013 |
| KR | 20140142023 A | | 12/2014 |
| WO | 2008053226 A1 | | 5/2008 |
| WO | 2009138963 A1 | | 11/2009 |
| WO | WO 2015/169844 | * | 11/2015 |

OTHER PUBLICATIONS

PCT International Search Report and the Written Opinion, Application No. PCT/GB2016/051141 filed Apr. 22, 2016, dated Jun. 28, 2016.

* cited by examiner

GEARBOX ASSEMBLY FOR AN ELECTRIC POWER STEERING ASSEMBLY

CROSS-REFERENCE TO RELATED APPLICATIONS

This application is a national stage of International Application No. PCT/GB2016/051141, filed 22 Apr. 2016, the disclosures of which are incorporated herein by reference in entirety, and which claimed priority to Great Britain Patent Application No. 1511811.0, filed 6 Jul. 2015, and Great Britain Patent Application No. 1506952.9, filed 23 Apr. 2015, the disclosures of both of which are incorporated herein by reference in entirety.

BACKGROUND OF THE INVENTION

This invention relates to gearbox assemblies for electric power steering assemblies of the worm and wheel type.

Electric power steering systems use an electric motor to produce an assistance torque that is applied to a rotating part of the steering system. In a conventional arrangement this torque assists the driver in turning the wheel. Because motors work best at relatively high speeds and because compact motors produce relatively low torques, the connection between the output of the motor and the steering column is usually through a reduction gearbox.

The most widely used type of electric power assisted steering reduction gearboxes are of a relatively simple Worm and Gear configuration similar to that shown in FIG. 1 of the accompanying drawings. The gearbox assembly 100 typically comprises a gearbox housing 102 which houses a worm shaft 103 and a gear wheel 104. The worm shaft is connected to the output of an electric motor (shown in part at the far right). The motor may be secured to an end face of the housing or even located within the housing. The worm shaft is supported by a main bearing assembly 105 at an end closest to the motor and a tail bearing assembly 106 at an end furthest from the motor, both bearing assemblies typically comprising ball bearing elements supported within an inner bearing race that is threaded onto the worm shaft and an outer bearing race that is secured to the housing. The function of the bearings assemblies is to allow the worm shaft to rotate whilst to a certain degree limiting axial and radial movement as will be explained. The gear wheel is connected to an output shaft of the gearbox and located so that teeth of the gear wheel engage teeth of the worm shaft.

It is known that the speed reduction gearboxes used in Electrical Power-assisted Steering (EPS) apparatus are prone to rattle due to external torsional vibrations acting at their Output Shafts. These vibrations originate at the road wheels due to surface roughness or unbalanced wheels. Alternatively, mechanical noise can arise from sudden torque reversals applied at the steering wheel by the driver. The main rattle sites in a worm and wheel gearbox are at the engagement of the worm and gear teeth and at the "main" ball bearing, closest to the motor, which axially locates the worm shaft.

A well-known solution to the rattle is the so-called "Sprung Worm" mechanism. In the "Sprung Worm" mechanism, a biasing means such as a leaf spring 107 applies a biasing force that urges the worm shaft into engagement with the wheel gear. The biasing means requires a small amount of radial movement of the worm shaft and this is achieved by allowing it to pivot around its axis in the plane of the gearwheel by a small angle (typically less than +/−0.5 degrees) either side of its nominal position around an axis which is nominally at the centre of the main bearing. This movement is controlled by a specially configured tail bearing that is allowed to move by small amounts (typically less than +/−0.5 mm) and typically by the main bearing having sufficient internal axial clearance between its balls and the sides of its race grooves to permit a small articulation (i.e. tilting) angle which is typically less than +/−0.5 degrees.

The support for the tail bearing can be provided in a number of ways. These typically involve the bearing being able to deform, or slide or roll relative to a fixed support connected to or forming a part of the housing. In the example as shown in FIG. 1 the outer race of the tail bearing is located by a plastic collar supported by two pairs of compressible O-rings 108.

BRIEF SUMMARY OF THE INVENTION

A feature of the present invention is to ameliorate problems that have been identified by the applicant in prior art gearbox assemblies associated with the need to enable the tail end of the worm shaft to move radially.

According to a first aspect the invention provides a gearbox assembly for an electric power assisted steering apparatus comprising:

a gearbox housing which houses a worm shaft and a gear wheel, the worm shaft being supported relative to the housing by a main bearing assembly at an end closest to the motor and by a tail bearing assembly at an end furthest from the motor, and the gear wheel being supported by an output shaft having at least one end that provides a take-off from the gearbox assembly, in which at least the tail bearing assembly is free to move relative to the housing through a limited range of motion that enables the worm shaft to move radially away from the axis of the wheel gear, and further including a biasing means that applies a biasing force to the tail bearing assembly that biases the worm shaft into engagement with the wheel gear, characterised in that the tail bearing assembly comprises an inner race and an outer race separated by bearing elements, the gearbox assembly further comprising a first guiding surface upon which the outer race is supported, the outer race being able to move by rolling along the guiding surface when a radial load is applied to the tail bearing assembly by the worm shaft, and further comprising a guide device which contacts both the outer bearing and a second guiding surface, the biasing spring acting upon the tail bearing assembly indirectly by acting upon the guiding device which in turn acts upon the bearing assembly.

The guiding device may comprise a roller and may be positioned such that rolling movement of the outer bearing causes the roller to roll over the second guiding surface. The roller may simultaneously roll over the outer race of the tail bearing assembly. The roller therefore controls the movement of the bearing, helping to locate it radially and guide it as it moves to and fro radially.

The roller may comprise a cylinder that has a central axis that is generally parallel to the axis of the tail bearing, the outer surface of the roller engaging an outer surface of the outer race and also engaging the second guiding surface.

The roller may, in use, roll along the second guiding surface and the inner bearing as the inner bearing moves relative to the first guiding surface. Thus, there may be no sliding between the roller/second guiding surface/outer race as the outer race moves. But it may also slide a little as well as roll, or only slide. Rolling is preferred as the effects of friction are therefore not relevant.

The roller may be provided with flanges that help prevent the leaf spring slipping off from the roller when under load. In an alternative, a groove may be provided around the circumference of the roller into which the end of the leaf spring is located.

The first and second guiding surfaces may be respectively be defined by one of a pair of opposing walls, the guide device and bearing assembly being positioned between the walls with the outer bearing contacting one wall and the guide device contacting the other. One wall therefore defines the first guiding surface, and the other wall the second guiding surface.

The walls may be the side walls of an elongate slot. The tail end of the worm shaft may pass through this slot.

The slot may be a slot in a guide plate that may be secured to a main body of the housing, which may be a casting. In an alternative the guiding surface may be formed directly in a casting of the housing.

The roller of the guide device may include one or more flanges which retain it in the slot in the direction of the worm axis.

The walls may terminate at a base of the slot, the base limiting the amount of movement of the tail bearing assembly towards the centre line of the gear wheel as the outer race comes into contact with the base of the slot.

The gap between the walls, for example the width of the slot, may be constant over a length of the wall along which the outer race rolls during normal use of the gearbox assembly, the roller and outer race being located between the walls.

The gap between the walls may be less than the sum of the outer diameter of the contact faces of the roller of the guide device and the outer diameter of the tail bearing outer race, so that a plane that connects the centres of the tail bearing assembly and roller cannot be orthogonal to the plane of the walls. This means the roller and guide device cannot pass each other between the walls as they move.

The axis of the roller may be positioned on the opposite side of the centre line of the worm shaft to the gear wheel. Typically the guide device may be positioned spatially above the bearing assembly.

In a preferred arrangement, the plane passing through the centres of the tail bearing assembly and the cylinder is at an angle relative to a normal to the plane of the gear wheel of between 1° and 60° and which ensures that the roller is not squeezed out of position nor is caused to jam in the slot.

The biasing spring may apply a force to the roller that has a component that is parallel to the walls that define the guiding surfaces. The biasing spring may comprise a leaf spring. The spring may apply sufficient force to reduce rattle in the gearbox assembly.

The leaf spring may act directly onto the guide device.

A contact pad of low friction material may be located between the leaf spring and the guide device, to reduce friction acting on the guide device allowing it to roll relatively unimpeded.

The bearing elements may comprise balls or rollers, or a mix of balls and rollers. They may be metal.

The main bearing assembly may comprise an annular bearing comprising an inner bearing race connected to the worm shaft and an outer bearing race connected indirectly to the housing (through the pivot or linear bearing), the inner and outer races being free to rotate relative to a common axis coincident with the axis of the worm shaft by bearings that are located in tracks in each of the races. The main bearing and tail bearing should prevent unwanted radial movement of the inner bearing (and hence worm shaft) relative to the outer bearing (and hence the housing).

An outward-travel stop for the Tail bearing assembly may be incorporated directly into the Guide Plate, or into the Main Housing. This may be in the form of a fixed abutment with a slightly flexible contact area. This may comprise a base of a slot in the plate or housing that defines the guiding surface. The outward travel stop provides a mechanical limit for the range of movement of the tail bearing roller in an outward direction, corresponding to movement of the worm shaft away from the centre of the wheel gear. Generally this will be a limit on the upward vertical movement of the tail bearing.

The outward travel stop may comprise a fixed stop at one end of the slot by which the movement of the tail bearing is restricted, or it may comprise an adjustable stop at one end of the slot by which the movement of the second bearing is restricted.

The outward travel stop may act upon the outer race of the tail bearing, or may act upon the roller.

Where it acts upon the roller, the coefficient of expansion of the material of the guide plate may be chosen to provide temperature compensation for the effects of thermal expansion in the gearbox that would lead to a change in the gear centres, thereby setting the end stop position more optimally over a range of temperatures compared with the end stop acting on the bearing outer race.

The outward travel stop may comprise an elongate rod or bolt that is located in a bore in the guide plate. The rod or bolt may be adjustable within the bore to provide adjustment of the position of the end stop.

The rod or bolt may be inclined relative to the direction of movement of the tail bearing in the guide plate. This may allow the lateral force capability of the end stop before the roller starts to slip to be increased when the bearing is at the limit of travel compared with a rod or bolt that is parallel to the direction of movement of the tail bearing in the guide plate.

As the direction of movement of the tail bearing is generally vertical, the end stop may therefore be inclined at an acute angle away from vertical of between, say 5 degrees and 30 degrees. This ensures that the force applied to the end stop by the outer bearing race is more aligned with the axis of the rod or bolt compared to the case if the rod or bolt was vertical.

The worm shaft may be supported by the main bearing assembly and tail bearing assembly so that it is able to swing in the plane of the gear wheel around a pivot centre which is closer to the main bearing assembly than to the tail bearing assembly.

Other advantages of this invention will become apparent to those skilled in the art from the following detailed description of the preferred embodiments, when read in light of the accompanying drawings.

DETAILED DESCRIPTION OF THE INVENTION

Figure 1:
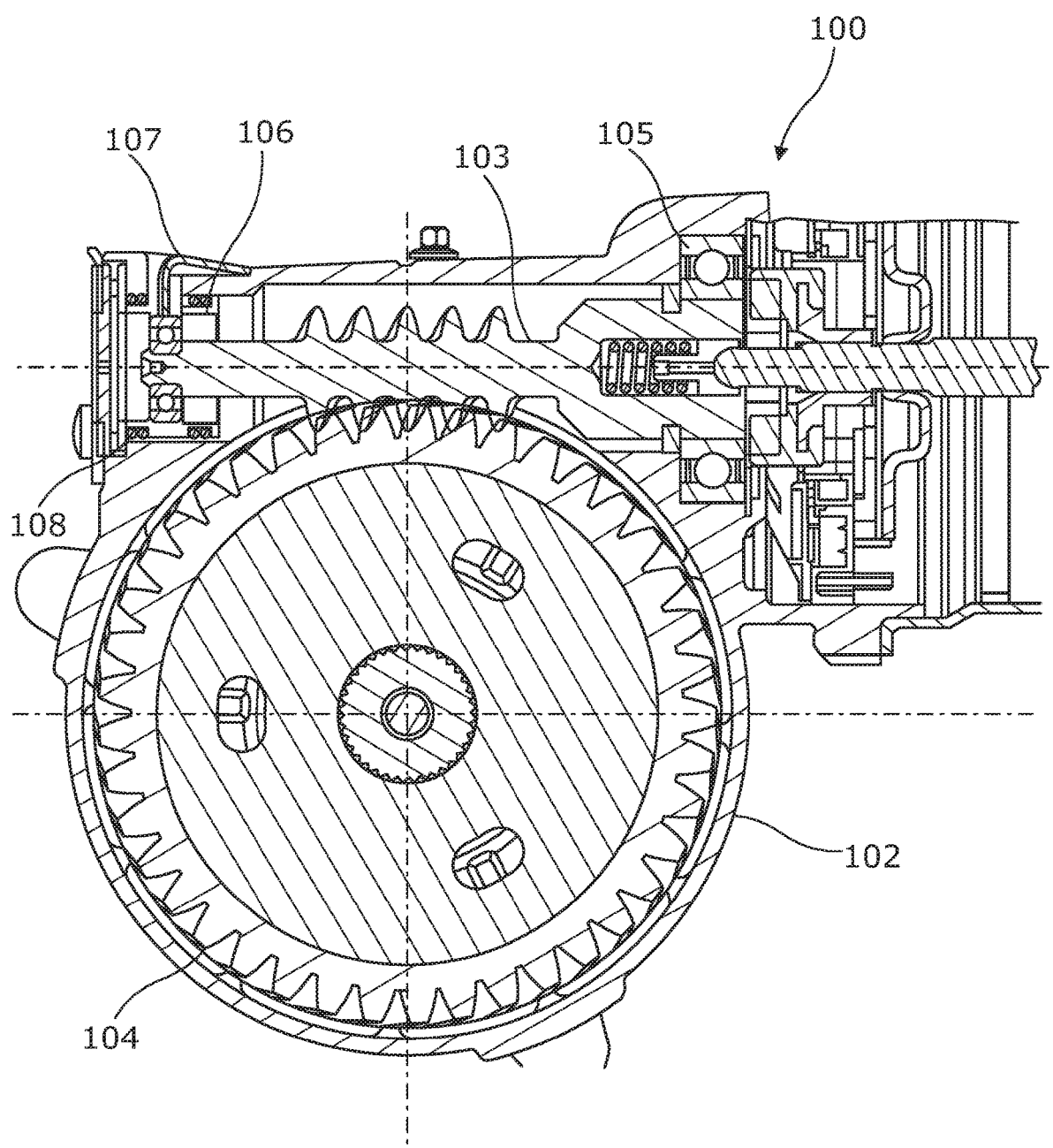
FIG. 1 is part cross section view of a prior art gearbox assembly for an electric power assisted steering system.

FIGS. 2 through 7 show an embodiment of a gearbox assembly 1 in accordance with an aspect of the Invention that can be incorporated into an electric power assisted steering apparatus. In use the gearbox assembly 1 provides a geared reduction in the output of an electric motor of the steering apparatus, allowing torque generated by the motor to be transferred to the steering column or rack (or other part of the steering system), the torque assisting the driver to turn the wheel or providing the principle source of steering torque.

The gearbox assembly 1 comprises a gearbox main housing casing 2 which houses a worm shaft 3 connected to the rotor of an electric motor 4 through a pin and a torque-transmitting coupler. The worm shaft 3 comprises an elongate shaft that carries a worm gear 3a. The shaft 3 is supported by a main bearing assembly 5 at the side of the worm 3a that is closest to the motor 4 and by a tail bearing assembly 6 at an end of the shaft 3 furthest from the motor 4. Both bearing assemblies 5, 6 comprise an annular inner race that is threaded onto the shaft 3 and an annular outer race supported by the housing, with a set of ball bearings connecting the inner race to the outer race. As will be described both the bearing assemblies are able to move, in use, by a small amount relative to the housing 2 as torque is applied to the gearbox assembly 1.

The worm 3a is connected to a gear wheel 10 that is also housed in the housing. The wheel 10 is supported on an output shaft 11, the two ends 12, 13 of which are accessible from outside of the gearbox. One end 11 of the output shaft 11 is connected to the steering shaft and onwards to the steering wheel (not shown), and the other end 13 of the output shaft 11 is connected to the steering rack and onwards to the road wheels. The output shaft 11 therefore provides a mechanical path directly from the steering wheel to road wheels in this example and the gear wheel transfers torque from the motor to the output shaft to assist the driver.

The gear wheel 10 and worm gear 3a each have complimentary teeth that are meshed and may be in a single contact or double contact condition. In the former, each worm tooth that is engaged with the worm wheel at a given instant in time will contact at most only a single gear wheel tooth, and in the later condition at least one worm tooth will be in contacts the flanks of two gear wheel teeth at a given instant in time.

The main bearing assembly and tail bearing assembly allow some controlled axial movement of the worm shaft 3 and pivoting of the worm shaft. To avoid rattle both bearing assemblies should have minimal free play between the inner and outer races for both radial and axial movement. The manner in which the bearings are supported relative to the housing 2 will now be described.

Figure 2:
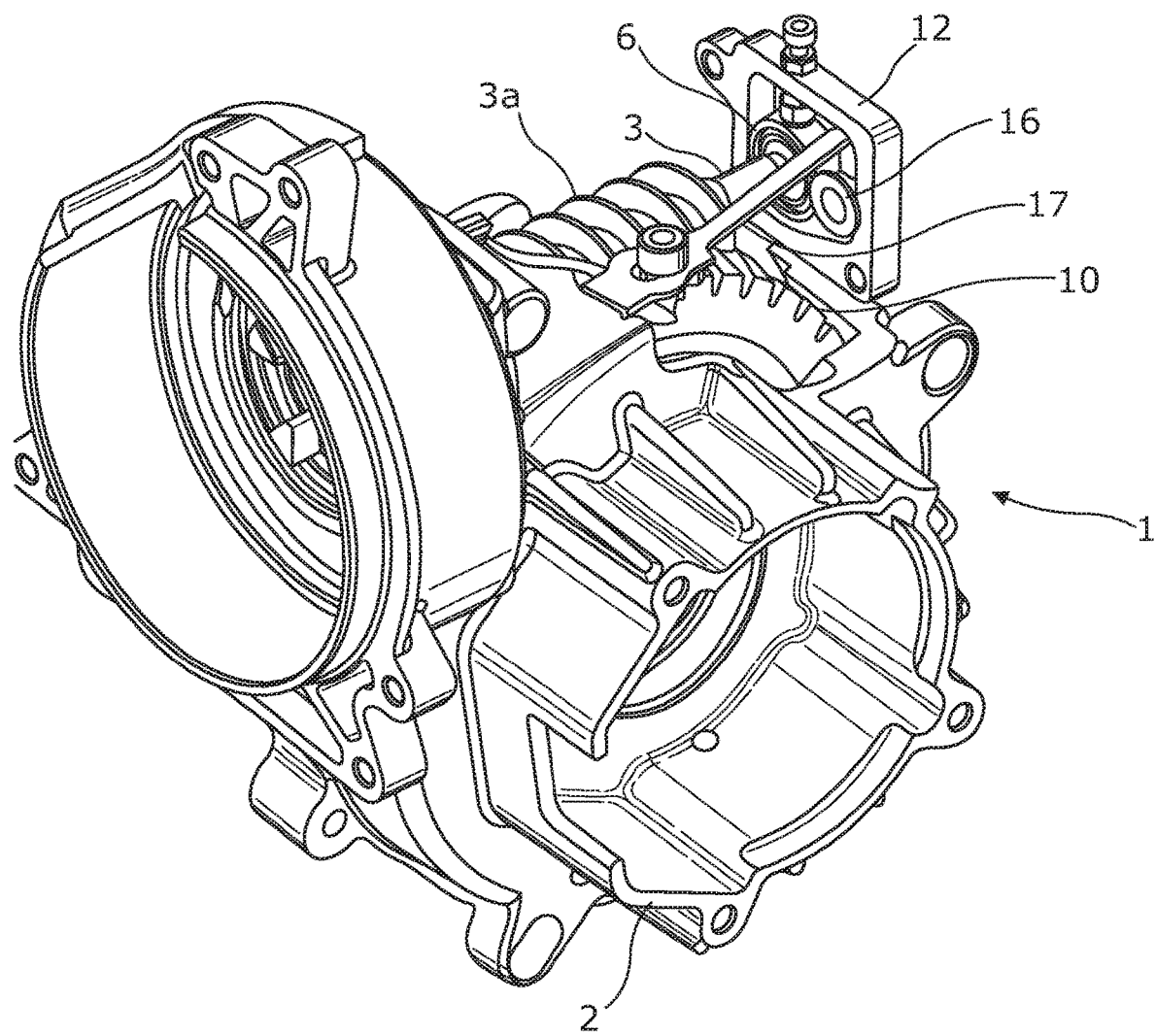
FIG. 2 is a perspective view of a part of a gearbox assembly in accordance with the present invention with a piece of the main housing casting cut away so as better so show the location of the tail bearing assembly.
Figure 3:
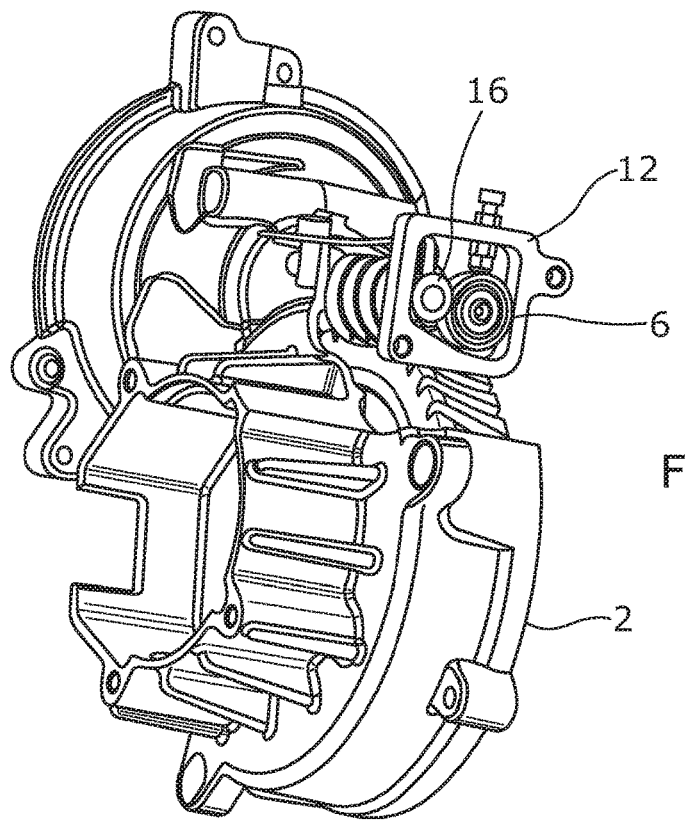
FIG. 3 is an alternative perspective view of the gearbox of FIG. 2.
Figure 6:
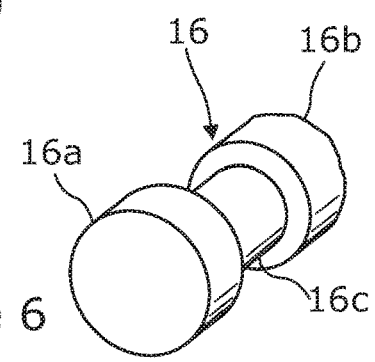
FIG. 6 is an enlarged view of the roller of the guiding device.
Figure 4:
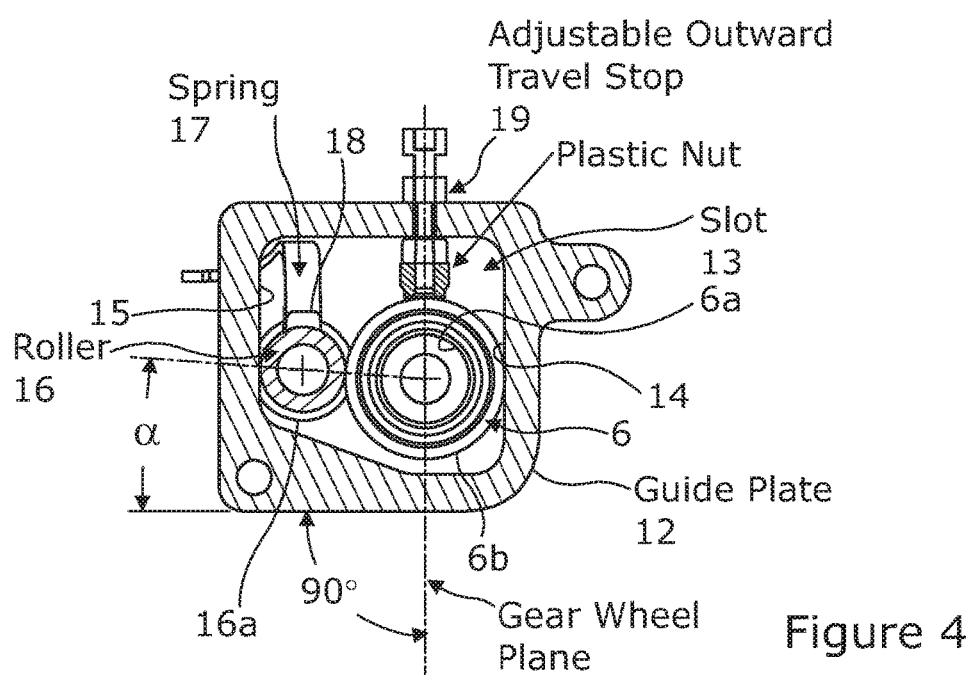
FIG. 4 is a view in cross section of the tail bearing assembly and the parts that locate it relative to the gearbox housing.
Figure 5:
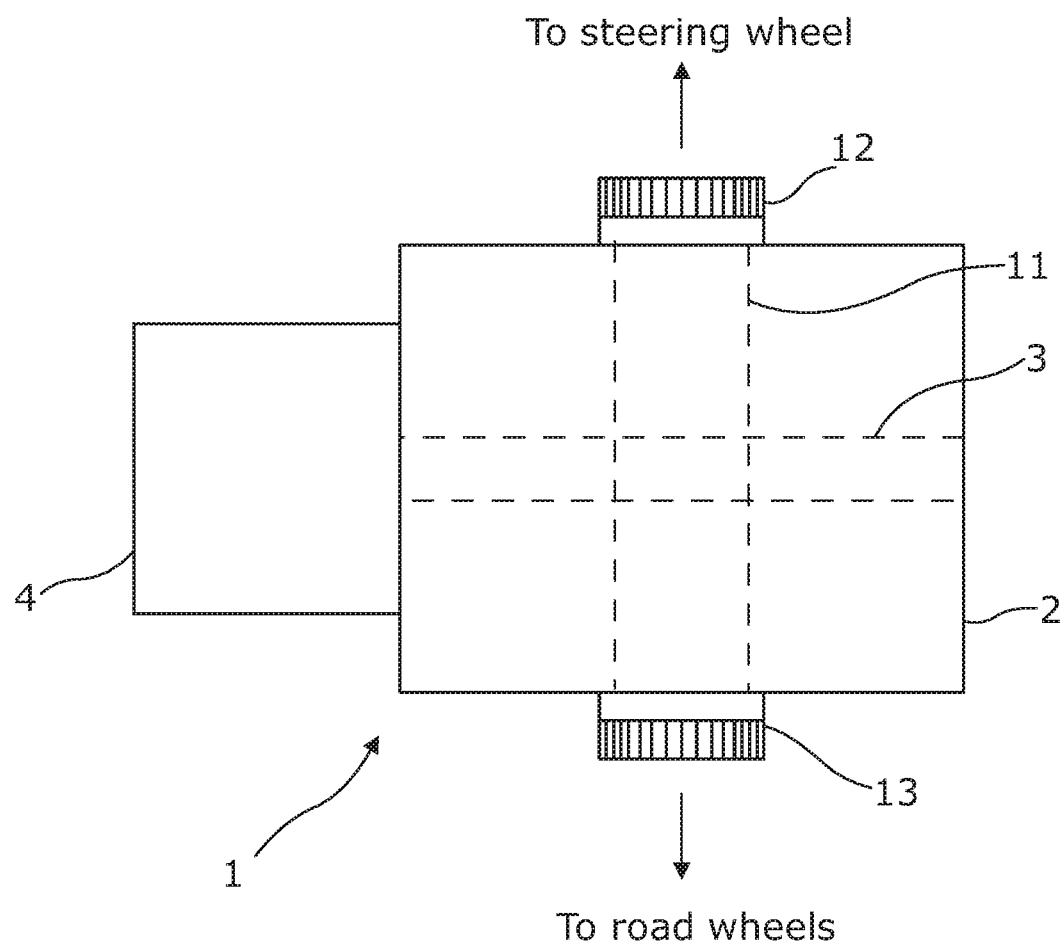
FIG. 5 is an overview of the gearbox assembly of FIGS. 3 and 4 showing the relative position of the motor, worm shaft and wheel shaft in the housing.
Figure 7:
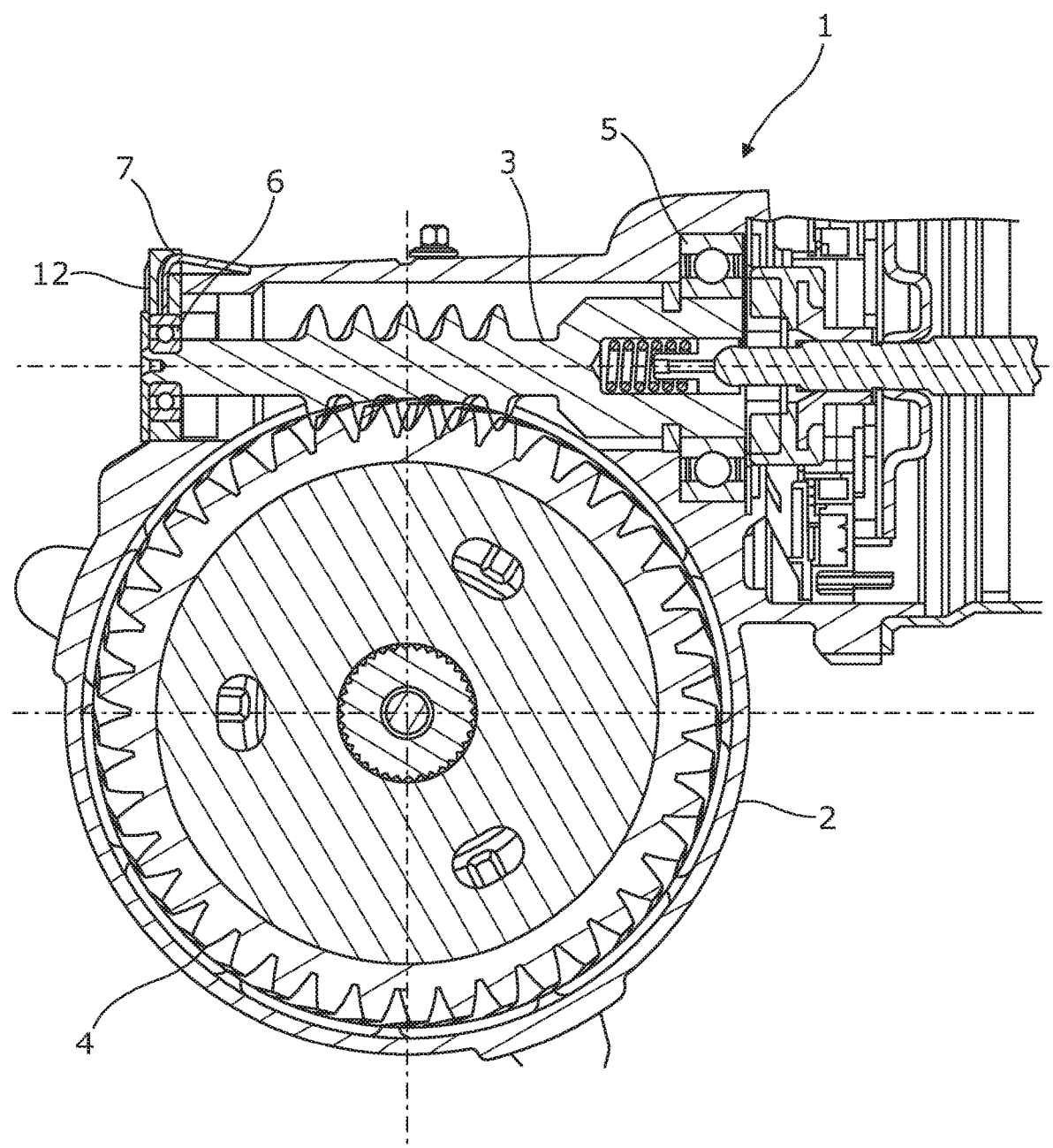
FIG. 7 is a view of the gearbox assembly of FIGS. 3 to 6 that corresponds with the view of the prior art gearbox shown in FIG. 1.

As shown in FIGS. 2 to 4, a rigid Guide Plate 12 is fixed to the Gearbox Housing 2. The plate 12 has a slot 13 within it, the slot 13 defining two generally vertical opposing side walls 14, 15 that define a first guiding surface and a second guiding surface respectively. The surfaces are smooth and face each other across the slot. The slot 13 is closed at both ends. Located between the two side walls 14, 15 are the outer bearing assembly 6 and a guide device in the manner described below.

The guide device comprises a flanged roller 16 of circular cross section, the outer circumferential face 16c of the roller between the flanges 16a, 16b engaging one of the side walls that defines a guiding surface. The flanges 16a, 16b prevent the roller 16 moving axially and the spacing between the flanges is chosen to be slightly greater than the thickness of the plate 12 in the vicinity of the side wall 15.

The Tail Bearing assembly 6 comprises an inner race 6a, an outer race 6b and bearings between the races. The tail end of the worm shaft 3 is threaded through the inner race 6a, and the outer circumferential face of the outer race contacts the other side wall 14 of the guide plate 12, i.e., contacts the other guiding surface. Again the outer bearing race 6b may be provided with optional flanges to stop it moving axially or may be constrained by virtue of the inner race 6a being fixed to the worm shaft. The spacing between the walls 14, 15 of the slot is chosen to be less than the sum of the diameters of the contact portions of the roller 16 and outer bearing race 6 so that they contact one another at a single point. The outer bearing race 6b is located closer to the bottom of the slot in this embodiment than the roller 16 is to the bottom of the slot.

A biasing means, in the form of a leaf spring 17, acts between the housing 2 and the tail bearing outer race to bias the tail bearing in towards the gear wheel 10. The spring is a hook-ended leaf spring, which is cantilevered from the screw indicated, presses down on the outer race of the tail (the smaller) bearing. The hooked end of the Anti-Rattle Spring (ARS) does not contact the outer bearing race 6b directly but instead bears down on the Roller 16. This applies a force that presses the roller 16 into contact with the side wall 15 and the outer bearing race 6b, in turn pressing the outer bearing race 6b down towards the base of the slot. The movement of the outer bearing race is opposed by the worm shaft. An optional low friction pad 18 is provided between the tip of the spring and the roller.

In use, the worm shaft is guided to move in the plane of the gear wheel by means of the fixed parallel sided slot against one side of which the tail bearing assembly rolls and against the other side of which slot the separate cylinder rolls onto which the spring imposes a force which is substantially parallel to the gear wheel plane. The addition of the Roller enables the Tail bearing to move along the slot in the plane of the Gear Wheel with a pure rolling action; i.e. without having to slide on the guiding surface defined by the walls of the Guide Plate. Furthermore, the Tail Bearing is very rigidly prevented from moving normal to the Gear plane.

As stated the Roller 16 in this embodiment has flanges 16a, 16b to retain it in the Guide Plate 12, in the direction of the worm axis. It is important to size the Roller 16 so that the inclination, relative to a normal to the gear wheel plane (shown in FIG. 4 as angle α), of the "contact" plane passing through the centres of the Roller and the Tail Bearing assembly is small enough to prevent the side loads acting on the Worm shaft from squeezing the Roller out of position. The maximum angle α allowed is a function of the friction coefficients which exist between the Roller 16 and the Tail Bearing assembly 6 and between the Roller 16 and the Guide Plate 12 and also the force being applied to the Roller 16 by the leaf spring 17. On the other hand, the said inclination has to be large enough to prevent the Tail Bearing and Roller from jamming in the Guide Plate 12. A value of around 5 degrees for α may be suitable.

The vertical movement of the tail bearing is limited by an outward travel stop 19, which as shown comprises a threaded adjustable rod and a head, the rod passing vertically through a bore in the guide plate 12 to engage the tail bearing when it reaches a maximum desired vertical position.

The embodiment described above eliminates unwanted movement of the worm shaft tail bearing normal to the gear plane. At the same time, the detail of the tail bearing assembly and connection to the housing allows the desired swing movement of the worm shaft in the gear plane to take place with reduced frictional resistance.

Figure 8:
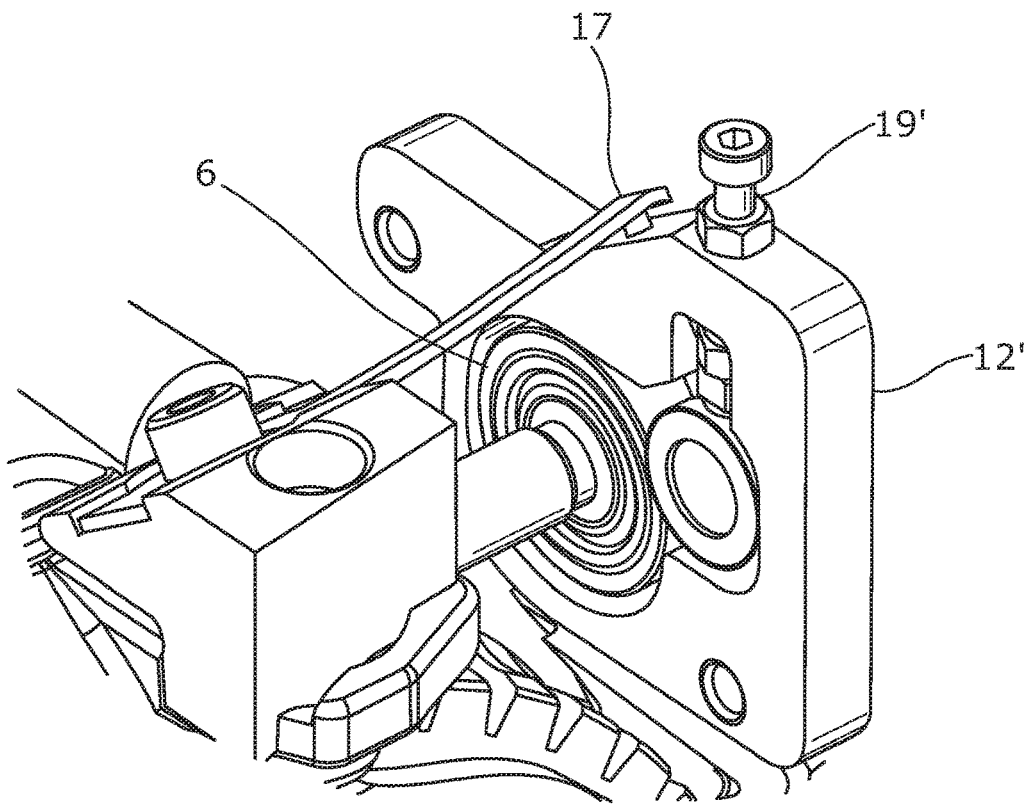
FIG. 8 is a first view of a portion of an embodiment of an alternative gearbox in accordance with the present invention.
Figure 9:
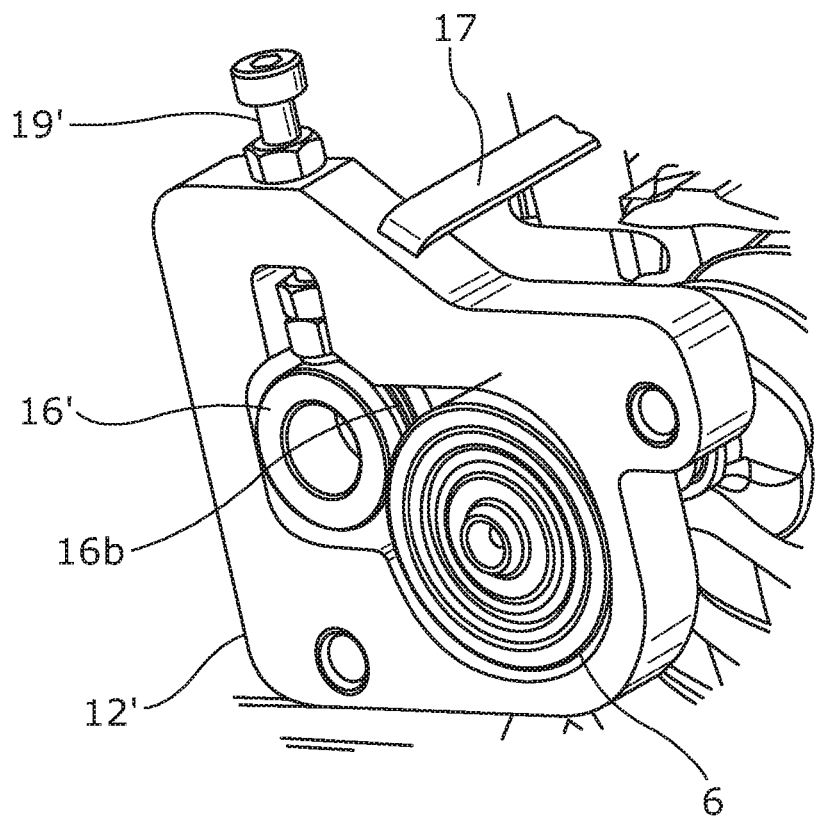
FIG. 9 is a second view of the gearbox of FIG. 8.

FIGS. 8 and 9 show an alternative gearbox assembly. For ease of reference those parts which are the same in this embodiment and the first embodiment have been indicated with identical reference numerals. In this second embodiment, the outward travel stop 19' acts upon the roller 16' instead of acting upon the outer tail bearing. The guide plate 12' in this embodiment is made from a material with a relatively high coefficient of expansion, for example aluminium, compared to the material used from the gears of the gearbox. This enables a degree of self adjustment of the end of outward travel position to be achieved that compensates for changes in temperature varying the centre to centre spacing of the gears so as better to regulate the range of allowable movement of the worm relative to the wheel gear.

Also shown in FIGS. 8 and 9, the roller 16' has a groove 16b around its outer circumference in which the end of the leaf spring is located. This removes the need for the flanges of the roller.

Figure 10:
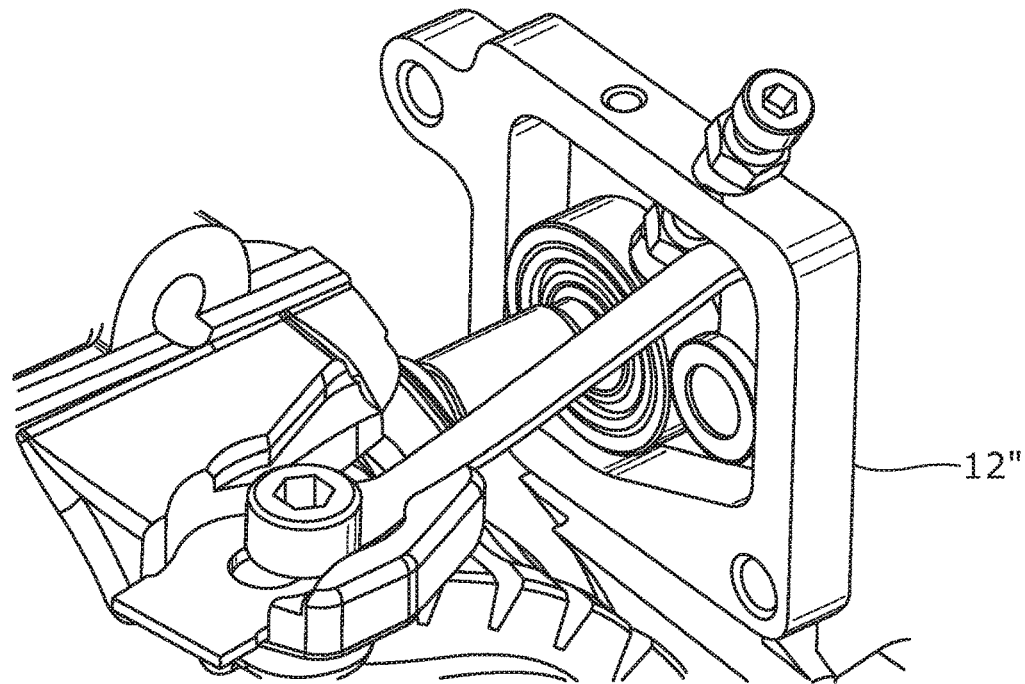
FIG. 10 is a first view of a portion of a further embodiment of an alternative gearbox in accordance with the present invention.
Figure 11:
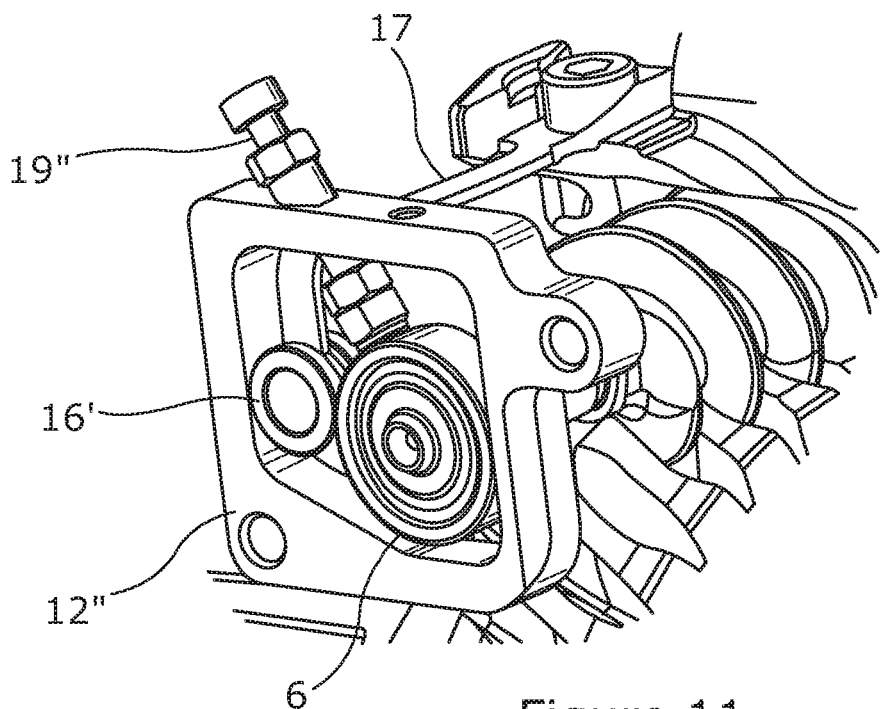
FIG. 11 is a second view of the gearbox of FIG. 10.

In another alternative arrangement shown in FIGS. 10 and 11, the outward stop 19" acts upon the outer bearing race 6" but is inclined at an acute angle relative to the direction of travel of the bearing race 6" within the guide plate 12". The end stop comprise a threaded bolt that is located in a complimentary inclined bore in the guide plate 12".

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

The invention claimed is:

1. A gearbox assembly for an electric power assisted steering apparatus comprising:
    a gearbox housing which houses a worm shaft and a gear wheel,
    the worm shaft being supported relative to the housing by a main bearing assembly at an end closest to a motor and by a tail bearing assembly at an end furthest from the motor, and the gear wheel being supported by an output shaft having at least one end that provides a take-off from the gearbox assembly,
    in which at least the tail bearing assembly is free to move relative to the housing through a limited range of motion that enables the worm shaft to move radially away from an axis of the gear wheel, and
    further including a biasing spring that applies a biasing force to the tail bearing assembly that biases the worm shaft into engagement with the gear wheel,
    wherein the tail bearing assembly comprises an inner race and an outer race separated by bearing elements, the gearbox assembly further comprising a first guiding surface upon which the outer race is supported, the outer race being able to move by rolling along the first guiding surface when a radial load is applied to the tail bearing assembly by the worm shaft, and further comprising a guide device which contacts both the outer bearing and a second guiding surface, the biasing spring acting upon the tail bearing assembly indirectly by acting upon the guide device which in turn acts upon the bearing assembly.

2. The gearbox assembly according to claim 1 in which the guide device comprises a roller positioned such that rolling movement of the outer bearing causes the roller to roll over the second guiding surface.

3. The gearbox assembly according to claim 2 in which the roller comprises a cylinder that has an axis that is generally parallel to an axis of the tail bearing assembly, an outer surface of the roller engaging an outer surface of the outer race and also engaging the second guiding surface.

4. The gearbox assembly according to claim 2 in which the first and second guiding surfaces are respectively defined by one of a pair of opposing walls, the guide device and bearing assembly being positioned between the walls with the outer bearing contacting one wall and the guide device contacting the other wall.

5. The gearbox assembly according to claim 4 in which the walls are the side walls of an elongate slot, a tail end of the worm shaft passing through the slot.

6. The gearbox assembly according to claim 5 in which the slot is provided in a guide plate that is secured to a main body of the housing.

7. The gearbox assembly according to claim 1 in which the guide device comprises a roller that includes one or more flanges which retain it in the slot in the direction of an axis of the worm shaft.

8. The gearbox assembly according to claim 5 in which the walls terminate at a base of the slot, the base limiting the amount of movement of the tail bearing assembly towards a centre line of the gear wheel as the outer race comes into contact with the base of the slot.

9. The gearbox assembly according to claim 4 in which a gap between the first and second guiding surfaces is constant over a length of the wall along which the outer race rolls during normal use of the gearbox assembly.

10. The gearbox assembly according to claim 5 in which the guide device comprises a roller and a gap between the first and second guiding surfaces is less than a sum of an outer diameter of a contact face of the roller of the guide device and an outer diameter of the tail bearing assembly outer race, so that a plane that connects the centres of the tail bearing assembly and roller cannot be orthogonal to a plane of the walls.

11. The gearbox assembly according to claim 10 in which an axis of the roller is positioned on an opposite side of a centre line of the worm shaft to the gear wheel.

12. The gearbox assembly according to claim 11 in which a plane passing through the centres of the tail bearing assembly and the roller is at an angle relative to a normal to the plane of the gear wheel of between 1° and 60° and which ensures that the roller is not squeezed out of position nor is caused to jam in the slot.

13. The gearbox assembly according to claim 2 which further includes an end of travel stop that acts upon the outer race of the tail bearing assembly, or acts upon the roller, and limits the movement of the worm shaft axis away from the gear wheel centre.

14. The gearbox assembly according to claim 6 in which the guide plate comprises a material with a higher coefficient of thermal expansion that the gear wheel and worm shaft.

15. The gearbox assembly according to claim 13 in which the end of travel stop comprises an elongate rod or bolt that is located in a bore in a guide plate, that is secured to a main body of the housing, and is inclined relative to the direction of movement of the tail bearing assembly in the guide plate.

\* \* \* \* \*